United States Patent [19]

Amstutz et al.

[11] Patent Number: 5,120,116
[45] Date of Patent: Jun. 9, 1992

[54] LIGHTED DISPLAY CASE

[75] Inventors: Douglas D. Amstutz, Muskegon; Ronald A. Vanderboegh, Twin Lakes, both of Mich.

[73] Assignee: Amstore Corporation, Muskegon, Mich.

[21] Appl. No.: 583,438

[22] Filed: Sep. 17, 1990

Related U.S. Application Data

[62] Division of Ser. No. 381,117, Jul. 17, 1989, Pat. No. 4,979,078.

[51] Int. Cl.⁵ .............................................. A47F 3/00
[52] U.S. Cl. .................... 312/114; 403/231; 403/403; 52/400; 52/781
[58] Field of Search ............ 312/114, 257.1, 263; 403/204, 231, 403; 52/397, 400, 780, 781

[56] References Cited

U.S. PATENT DOCUMENTS

| 661,505 | 11/1900 | Erikson . | |
|---|---|---|---|
| 858,547 | 7/1907 | Thorne . | |
| 932,164 | 8/1907 | Murnane . | |
| 952,506 | 3/1910 | Bumpus . | |
| 1,435,798 | 11/1922 | Biller . | |
| 1,846,485 | 2/1932 | Hart . | |
| 1,870,534 | 8/1932 | Skoogh . | |
| 1,953,357 | 4/1934 | Leya . | |
| 1,966,964 | 7/1934 | Kennedy . | |
| 2,171,378 | 8/1939 | Urbanek . | |
| 2,475,079 | 7/1949 | Clouse et al. . | |
| 2,546,564 | 3/1951 | Roselyn . | |
| 2,569,934 | 10/1951 | Kurtzon . | |
| 2,609,071 | 9/1952 | Morgann et al. | 52/400 |
| 2,942,924 | 6/1960 | Stangert . | |
| 3,275,394 | 9/1966 | Massinger . | |
| 3,381,434 | 5/1968 | Carson | 52/397 |
| 3,958,383 | 5/1976 | Dallen | 52/400 |
| 4,006,569 | 2/1977 | Kain | 52/397 |
| 4,196,952 | 4/1980 | Crowe . | |
| 4,322,572 | 3/1982 | Snyder . | |
| 4,385,850 | 5/1983 | Bobath . | |
| 4,395,080 | 7/1983 | Winn et al. . | |
| 4,509,806 | 4/1985 | Dudonyt | 312/140 |
| 4,556,148 | 12/1985 | Koller . | |
| 4,660,903 | 4/1987 | Shinagawa | 312/140 |
| 4,731,973 | 3/1988 | Stenemann | 312/140 |
| 4,948,203 | 8/1990 | Amstutz et al. . | |

FOREIGN PATENT DOCUMENTS

| 1065714 | 5/1956 | Austria | 312/140 |
|---|---|---|---|
| 2132153 | 1/1972 | Fed. Rep. of Germany | 312/140 |
| 2324919 | 12/1974 | Fed. Rep. of Germany . | |
| 1022560 | 12/1952 | France . | |
| 2628796 | 9/1989 | France | 403/403 |

*Primary Examiner*—Kenneth J. Dorner
*Assistant Examiner*—Brian K. Green
*Attorney, Agent, or Firm*—Warner, Norcross & Judd

[57] ABSTRACT

A display case having a framework and a plurality of panels forming an enclosure for the displaying of merchandise is provided with a light fixture for highlighting the merchandise therein. The light fixture is positively mounted to the framework through fasteners which are accessed from the interior of the enclosure. Furthermore, the panels are mounted upon extruded supports which reduce manufacturing costs and ease reinstallation of the panels.

5 Claims, 4 Drawing Sheets

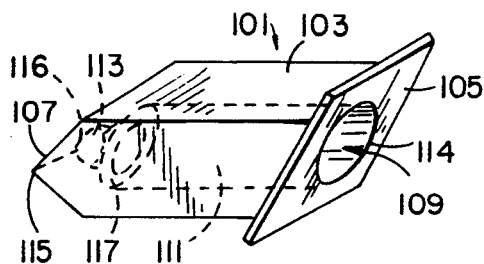
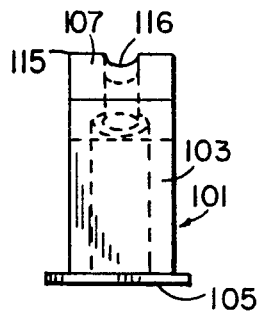
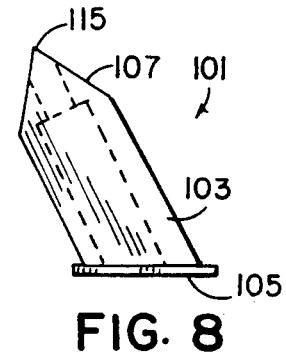
FIG. 6　　　　　FIG. 7　　　　FIG. 8
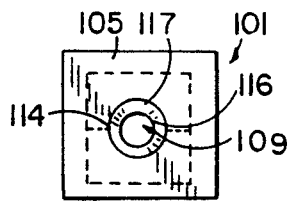
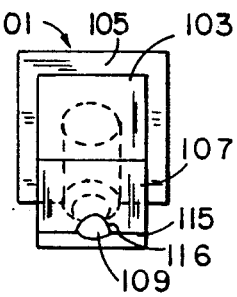
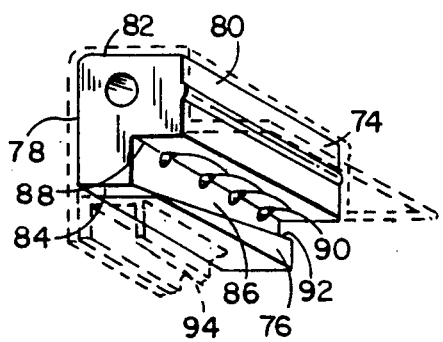
FIG. 9　　　FIG. 10
FIG. 11
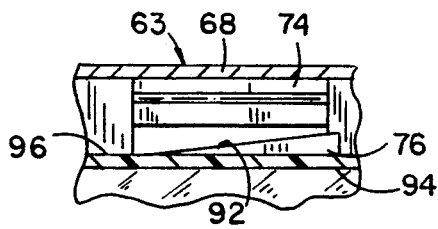
FIG. 12

5,120,116

LIGHTED DISPLAY CASE

This application is a divisional of Ser. No. 381,117, filed Jul. 17, 1989, now U.S. Pat. No. 4,979,078.

BACKGROUND OF THE INVENTION

The present invention pertains to a display case for displaying merchandise in a retail environment, and more particularly to a removable lighting fixture and panel support structure therefor.

Although display cases are manufactured in many different sizes and shapes, they all typically include a plurality of transparent panels positioned along the front, top, and sides of the case. Further, lighting fixtures are often provided along the upper front edge of the cases to favorably highlight the merchandise.

As can be readily appreciated, the panels through use become marred and scratched. Hence, many retailers periodically replace the panels to continue giving the display cases a fresh, new look. However, this task has generally required extensive disassembly of the case. For example, replacement of the front panel will in many instances require removal of the light fixture. However, the light fixture, in turn, often requires removal of the top panel and pads underlying the top panel to facilitate access to the heads of the bolts or screws mounting the light fixture in place. An example of one such construction is disclosed in copending U.S. patent application Ser. No. 161,902 filed Feb. 29, 1988, and entitled LIGHTED DISPLAY CASE.

This difficulty has been overcome in a display case described in copending patent application Ser. No. 279,591 filed Dec. 2, 1988, and entitled LIGHTED DISPLAY CASE. In this case, the light fixture is secured in an easily releasable manner which requires no removal of any of the panels. More specifically, the light fixture is slidably mounted on a plurality of biased mounting brackets. Yet, despite the substantial benefit gained through this unique arrangement, many retailers still prefer a more positively secured fixture, especially if the cases are subject to frequent jostling or moving.

Further, past display cases have included a planar deck, typically composed of particle board or the like, upon which the merchandise is set. The deck is generally supported on a lower portion of the framework beneath the panels. The deck is notched along its edges to form, in cooperation with the framework, a trough or recess into which the bottoms of the panels are received. An elastomeric border is generally also placed in the recess and about the bottom of the panel to effectively provide a tight, secure fit therefor. An example of such construction is disclosed in copending U.S. patent applications Ser. No. 161,902, filed Feb. 29, 1988, and entitled LIGHTED DISPLAY CASE, and Ser. No. 279,591, filed Dec. 2, 1988, and entitled LIGHTED DISPLAY CASE. While such a construction provides adequate support for the panel, it entails a relatively expensive manufacturing process since a number of machining passes on the deck are required to achieve the notched shape. Furthermore, repair or replacement of the panels is a time consuming and tedious task due to the difficulty in correctly positioning the very pliable border about the panel and in the trough.

SUMMARY OF THE INVENTION

In accordance with the present invention, a display case having a unique construction is provided to increase the efficiency in manufacturing the cases; and to increase the durability and dependability of a light mounting assembly while maintaining an easy disassembly procedure.

More specifically, the display case includes a rectangular framework which receives and interconnects the panels to define an enclosure and form a stable display case structure. The light fixture of the present invention is securely fastened to an upper front segment of the framework with a novel assembly which permits installation and removal of the fixture from within the enclosure. Further, removal and installation of the fixture may be accomplished in a quick and easy manner, without removing or disturbing the panels in any way. Also, the mounting assembly positively holds the fixture in place so that no slippage can occur.

Additionally, an unnotched deck is positioned to fit loosely into the framework, such that a marginal gap is formed therebetween. An elongated support having a relatively rigid body portion and a pliable border portion is received within the gap to hold and support the lower ends of the panels. Further, the pliable border portions function to accomplish a tight, secure mounting of the panels in the body, and to provide a molding aesthetically covering the gaps and edges of the assembled components. This construction, then, reduces manufacturing costs and eases the process of replacing the panels.

These and other objects, advantages, and features of the present invention will be more fully understood and appreciated by reference to the written specification and appended drawings.

BRIEF DESCRIPTION OF THE DRAWINGS

FIG. 6 is a perspective view of one of the sheaths of the present invention;

FIG. 7 is a front elevational view of the sheath;

FIG. 8 is a side elevational view of the sheath;

FIG. 9 is a bottom plan view of the sheath;

FIG. 10 is a top plan view of the sheath;

FIG. 11 is a perspective view of the rail filler;

FIG. 12 is a cross-sectional view taken along line XII—XII in FIG. 1, with the lighting system omitted for clarity;

DETAILED DESCRIPTION OF THE PREFERRED EMBODIMENT

Figure 1:
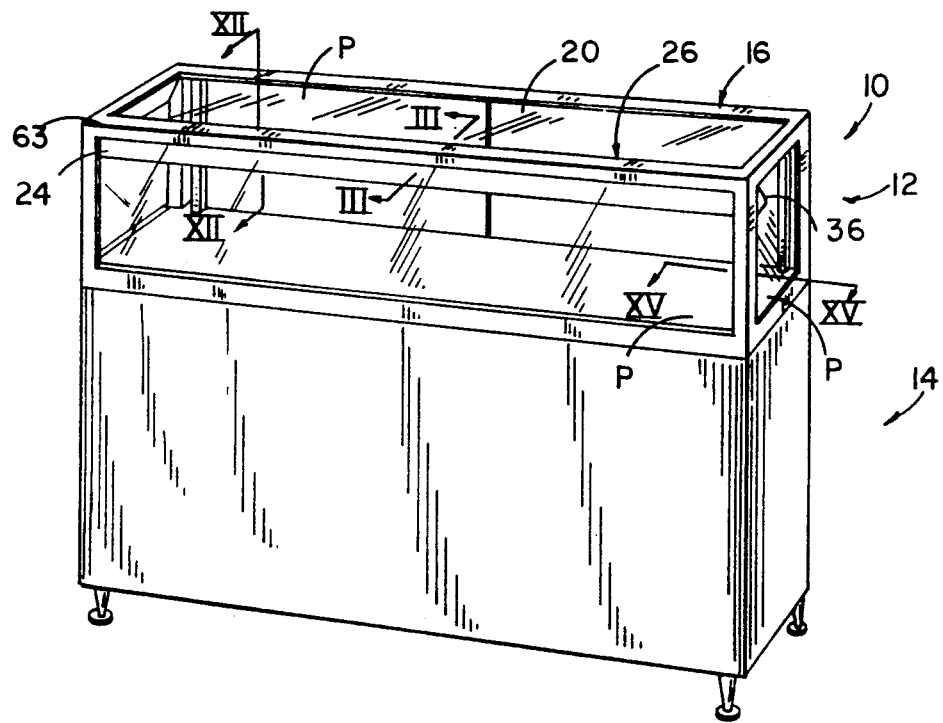
FIG. 1 is a perspective of a display case of the present invention.
Figure 2:
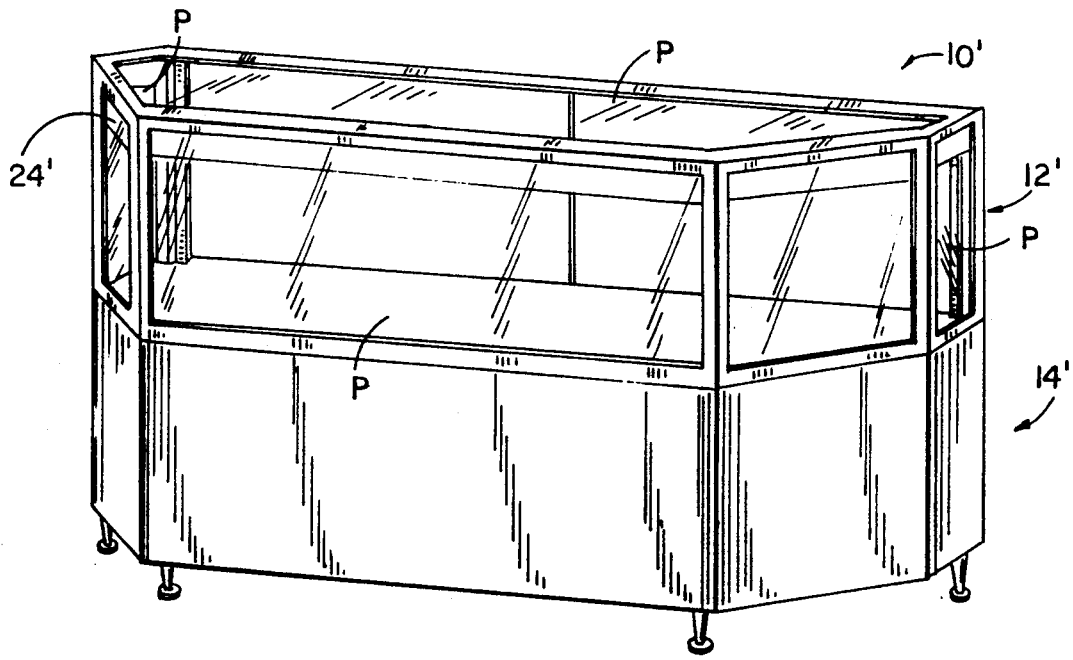
FIG. 2 is an alternative embodiment of a display case of the present invention.

In the preferred embodiment, a display case 10 includes an upper display portion 12 and a lower base portion 14 (FIGS. 1 and 2). Display portion 12 includes an integral framework 16, a plurality of panels P, a deck 18, and rear sliding doors 20. Panels P are generally transparent in order to maximize the viewing of the enclosed merchandise. The basic construction of the display case is the same, except as herein after differently described, as that disclosed in copending application Ser. No. 279,591 filed Dec. 2, 1988, and entitled LIGHTED DISPLAY CASE, which is herein incorporated by reference.

Figure 3:
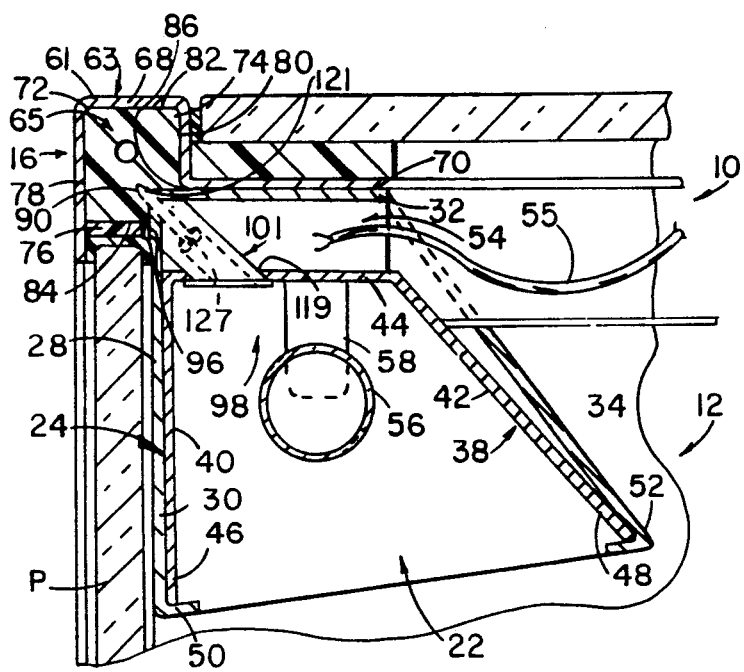
FIG. 3 is a cross-sectional view taken along line III—III in FIG. 1.
Figure 4:
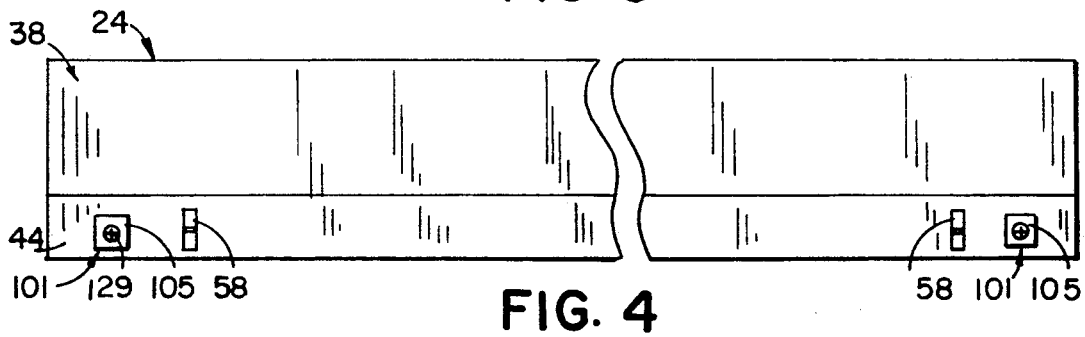
FIG. 4 is a bottom plan view of the light fixture of the present invention.
Figure 5:
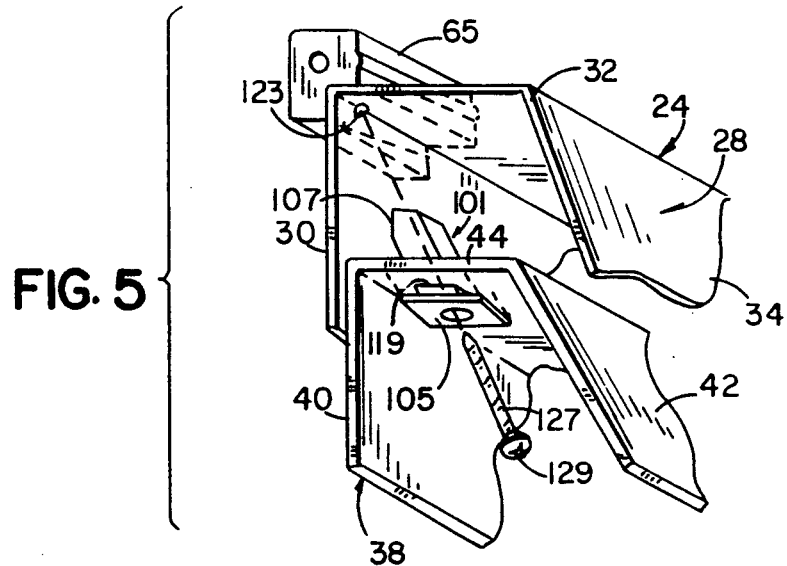
FIG. 5 is an exploded perspective view of the light fixture secured to the rail filler of the present invention.

A lighting system 22 is provided to effectively illuminate the interior of display portion 12 (FIGS. 3-5). The lighting system includes a light fixture 24 which is mounted within display case 10 along the upper front edge thereof. Fixture 24 includes an elongated housing 28 having a front wall 30, a top wall 32, a rear wall 34, and end walls 36. In the most preferred embodiment, housing 28 is shaped generally as a elongated truncated pyramid. However, a wide variety of shapes could be used. A reflector 38 having a pair of side walls 40, 42 and an interconnecting base wall 44 is mounted within housing 28. The outer edges 46, 48 of side walls 40', 42 are secured to the outer edges 50, 52 of front and rear walls 30, 34 of housing 28, by crimping, fastening, or other known means. Reflector 38 is of a smaller size than housing 28 such that a cavity 54 is defined between the two for the receipt of electrical wiring 55. To effectively illuminate the interior of display portion 12, one or more lamps 56 (depending on the size and shape of the display case) are secured within fixture 24. Lamps 56 are preferably conventional fluorescent tubes supported by sockets 58 extending downwardly from the reflector 38. Of course, other types of lamps could be used if desired. Housing 28 is preferably positioned within case 10 such that its rearward upper edge 60, defined by the intersection of rear wall 34 and top wall 32, is nested within the corner of the front segment 61 of framework 16.

Front segment 61 includes a front rail 63 and a rail filler 65 (FIGS. 3, 5, 11, and 12). Front rail 63 includes a U-shaped marginal portion 68 and a projecting platform 70 which supports the top panel P. Rail filler 65 is a block-like component preferably composed of ABS plastic (although other materials may be used). Rail filler 65 is dimensioned for mating receipt within trough 72, defined by marginal portion 68, at spaced apart locations along the front segment 61. Rail filler 65 is comprised of a pair of elements including a main body 74 and a wedge component 76. Main body 74 has a substantially block-like configuration having forward and rearward surfaces 78, 80 and top and bottom surfaces 82, 84. Additionally, the lower rearward corner of body 74 is cut out to form an inward corner 86. At the apex 88 of corner 86 a series of bores 90 are provided at an inclination of approximately 45° to horizontal. Bores 90, as described below, are used to mount light fixture 24 in its proper position. Wedge component 76 includes upper and lower faces 92, 94, wherein lower face 94 is adapted to be pressed against the upper edge 96 of the front panel P, and upper face 92 is adapted to matingly engage bottom surface 84 of main body 74. Upper face 92 and bottom surface 84 are positioned at parallel inclinations of approximately 5° to horizontal. In assembling of the case 10, wedge component 76 is slid longitudinally along upper edge 96 of panel P, until rail filler 65 is tightly secured between front rail 63 and the panel P such that it experiences no significant movement.

Light mounting assembly 98 includes a tubular sheath 101 having a main rectangular section 103, a planar mounting flange 105, and a tapered end 107 (FIGS. 3, 5, and 6-10). A stepped passage 109 extends centrally through sheath 101. Passage 109 includes a first larger segment 111 extending through main section 103 and a second narrower segment 113 extending through tapered end 107. Further, passage 109 defines a pair of circular openings 114, 116 at each end of sheath 101. Due to the differential in the diameters of segments 111, 113, an annular shoulder 117 is defined at the intersection of the main section 103 and tapered end 107. Sheaths 101 are mounted in light fixture 24 to effect the mounting of the fixture to framework 16.

More particularly, a plurality of spaced apart rectangular openings 119 are defined in the base wall 44 of reflector 38, and a corresponding number of concentrically aligned apertures 121 formed in corner 60 of housing 28 (FIGS. 3 and 5). Openings 119 matingly receive sheaths 101 therethrough such that mounting flanges 105 abuttingly engage wall 44. In this position, sheath 101 (other than mounting flange 105) is received completely within cavity 54. Tapered end 107 is nested into corner 123 of housing 28 such that second segment 113 of passage 109 is aligned with aperture 121.

Light fixture 24 is positioned against front segment 61 such that corner 60 is nested into inward corner 86 of rail filler 65, so that passages 109, apertures 121 and bores 90 are all in alignment (FIGS. 3 and 5). A screw 127 is then passed through each sheath 101 and turned into rail filler 65 until the head 129 is pressed against shoulder 117. In this way, light fixture 24 is securely mounted within case 10 in a manner that avoids any inadvertent slippage, drooping, or dropping of the fixture into the case. Moreover, light fixture 24 is easily removed from its mounted position without having to disturb any of the panels P. Furthermore, sheath 101 permits the passage of screws through fixture 34 without the danger of damaging any of the electrical wiring 55.

Figure 13:
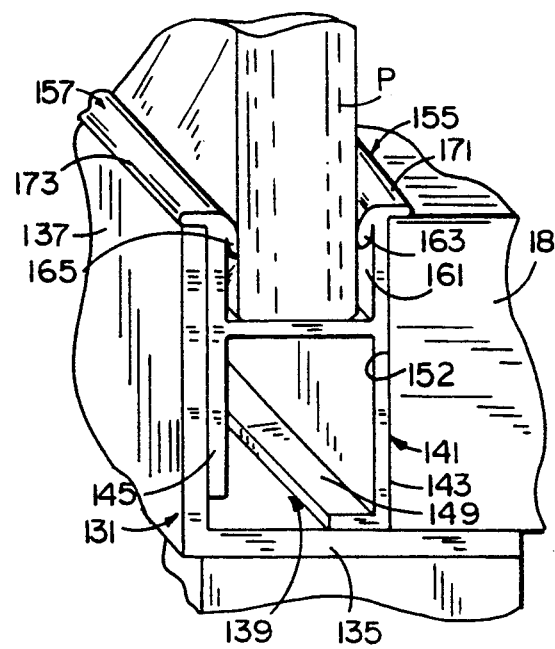
FIG. 13 is a fragmentary perspective view of a support of the present invention.
Figure 14:
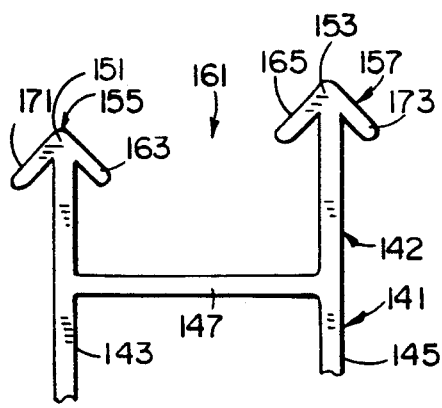
FIG. 14 is a fragmentary end elevational view of the support.
Figure 15:
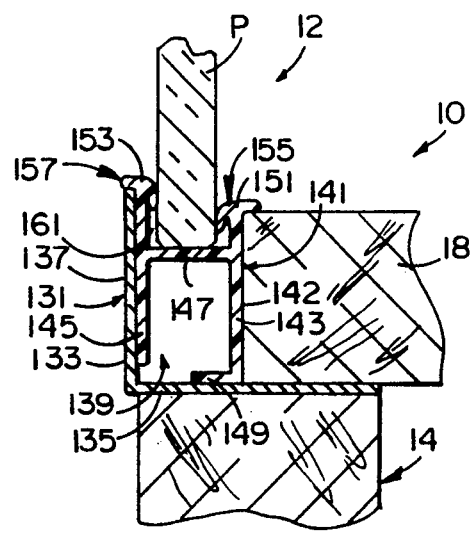
FIG. 15 is a cross-sectional view taken along line XV—XV in FIG. 1.

At the base of the display portion 12, deck 18 is set loosely upon a lower rectangular rim segment 131 of framework 16 (FIGS. 13-15). More specifically, rim segment 131 is comprised of a plurality of L-shaped rails 133 having a horizontal leg 135 and a vertical leg 137. Deck 18 has a substantially rectangular block-like shape which has a length and width dimension smaller than the distance between opposing vertical legs 137 of rim segment 131. Deck 18 is, then, positioned centrally on horizontal legs 135 such that a continuous peripheral gap 139 is provided along at least the sides and front of display case 10. The underside of the peripheral portion of the generally planar deck is thus overlyingly supported on the horizontal leg 135 with the generally vertical peripheral edge surface 152 of the deck disposed spaced apart from the vertical leg 137 to define the recess or gap 139. Deck 18 may be positioned contiguously along the rearward vertical leg 137 depending upon the particular doors used with the case.

In any event, an elongated support 141 is matingly received in gap 139 along the sides and front of case 10. Supports 141 function to receive and support the lower ends of the vertically oriented side wall panel P and provide a molding thereabout to create a more aesthetically pleasing assembly. Each support 141 is an elongated, extruded plastic member composed of preferably polyvinyl chloride (PVC); although other materials and manufacturing processes could be used. Supports 141 have a rigid body portion 142 formed with a pair of spaced apart, generally parallel side walls 143, 145"; and an interconnecting horizontal base 147 defining a substantially H-shaped cross-section. Side wall 145 is disposed in face to face relationship along the vertical leg 137, and side wall 143 is disposed in face to face relationship along the deck peripheral edge surface 152. In the most preferred embodiment, the inner side wall 143 is provided with a foot 149 for additional stability and support. A pliant border member 155, 157 is fixed along the upper end 151, 153 of each side wall 143, 145. Each border member 155, 157 has a substantially inverted V-shaped configuration which is affixed to one of the upper ends 151, 153 along its apex. Preferably, support 141 is extruded as a dual durometer extruded member of PVC, such that body portion 142 is rigid and the border members 155, 157 are pliable.

The upper regions of side walls 143, 145 and brace 147 collectively define a channel 161 adapted to receive a lower end of a panel P (FIGS. 13 and 15). When the panels P are inserted into channels 161 inner arms 163, 165 of borders 155, 157 are pressed downwardly and compressed between the inner surfaces 167, 169 of side walls 143, 145 and the panel P. This arrangement creates a tight friction fit securely holding the panels in place.

Further, when supports 141 are received in gaps 139 the upper ends 151, 153 of side walls 143, 145 are positioned slightly above or substantially flush with the top of deck 18 and vertical leg 137, respectfully. In this arrangement, outer arm 171 of border 155 engages deck 18 and is flexed outwardly to form a molding between the deck 18 and panel P. Similarly, arm 173 of border 157 engages vertical leg 137 of framework rim 131 and also flexes outwardly to form a molding between rim 131 and panel P. These moldings formed by arms 171, 173 reduce the visual impact of the assembled components and gaps therebetween, to give case 10 a more aesthetically pleasing appearance.

The above description is that of a preferred embodiment of the invention. Various alterations and changes can be made without departing from the spirit and broader aspects of the invention as set forth in the appended claims, which are to be interpreted in accordance with the principles of patent law including the Doctrine of Equivalents.

The embodiments of the invention in which an exclusive property or privilege is claimed are defined as follows:

1. A display case comprising:
   a frame work including a lower rim segment having a horizontal leg and a vertical leg, said vertical leg having a horizontal upper edge;
   at least one panel extending vertically upwardly from said framework and cooperating with said framework to define a side wall of an enclosure;
   a horizontally extending, generally planar deck having a peripheral portion thereof overlyingly supported on said horizontal leg of said rim segment, said deck having a generally vertical peripheral edge surface disposed spaced apart from said vertical leg thereby forming a recess disposed between said vertical leg and said peripheral edge surface and above said horizontal leg; and
   a support received within said recess, said support having a first, substantially rigid, upstanding wall disposed in face to face relationship along said vertical leg and a second, substantially rigid, upstanding wall spaced apart from and generally parallel to said first upstanding wall disposed in face to face relationship along said peripheral edge surface, the lower extent of said support disposed resting atop said horizontal leg, a lower edge of said panel being received between said first and second walls, said first upstanding wall terminating in a first upper end portion having a pliable molding element overlying said horizontal upper edge and a pliable border element tightly and frictionally engaging said panel, said second upstanding wall terminating in a second upper end portion having a pliable molding element overlying said peripheral portion and a pliable border element tightly and frictionally engaging said panel.

2. The display case of claim 1 wherein said first upper end portion is substantially inverted V-shaped when undeformed having a first arm comprising said molding element and a second arm comprising said border element.

3. The display case of claim 1 wherein said second upper end portion is substantially inverted V-shaped when undeformed having a first arm comprising said molding element and a second arm comprising said border element.

4. The display case of claim 1 wherein said first and second upper end portions are substantially inverted V-shaped when undeformed, each having a first arm comprising said molding element and a second arm comprising said border element.

5. The display case of claim 1 wherein said support is a unitary member.

* * * * *